United States Patent
Ma et al.

(10) Patent No.: US 9,494,815 B2
(45) Date of Patent: Nov. 15, 2016

(54) TN LIQUID CRYSTAL DISPLAY DEVICE AND TOUCH CONTROL METHOD THEREOF

(71) Applicant: Shanghai Tianma Micro-Electronics Co., Ltd., Shanghai (CN)

(72) Inventors: Jun Ma, Shanghai (CN); Lijun Zhao, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 248 days.

(21) Appl. No.: 14/085,766

(22) Filed: Nov. 20, 2013

(65) Prior Publication Data

US 2014/0176465 A1 Jun. 26, 2014

(30) Foreign Application Priority Data

Dec. 24, 2012 (CN) .......................... 2012 1 0567635

(51) Int. Cl.
*G06F 3/041* (2006.01)
*G02F 1/1333* (2006.01)
(Continued)

(52) U.S. Cl.
CPC ..... *G02F 1/13338* (2013.01); *G02F 1/134309* (2013.01); *G06F 3/041* (2013.01);
(Continued)

(58) Field of Classification Search
CPC ................. G06F 3/041; G06F 3/0412; G06F 3/044; G02F 1/13338; G02F 1/134309; G02F 1/1396; G02F 2001/134318
See application file for complete search history.

(56) References Cited

U.S. PATENT DOCUMENTS

| 5,162,933 A | * | 11/1992 | Kakuda | .................. H01L 27/13 257/55 |
| 5,668,379 A | * | 9/1997 | Ono | .................... H01L 27/1259 257/347 |

(Continued)

FOREIGN PATENT DOCUMENTS

| CN | 101470556 A | 7/2009 |
| CN | 102736291 A | 10/2012 |

(Continued)

OTHER PUBLICATIONS

Extended European Search Report issued on Mar. 20, 2014 in European Application No. 13193968.8, 9 pages.

*Primary Examiner* — Amare Mengistu
*Assistant Examiner* — Crystal A Mathews
(74) *Attorney, Agent, or Firm* — Alston & Bird LLP (57) ABSTRACT

A twisted nematic liquid crystal display device integrated with a touch control function is disclosed. The device includes an array substrate, a color film substrate disposed opposite the array substrate, and a liquid crystal layer disposed between the array substrate and the color film substrate. The device also includes a common electrode layer disposed on a surface of the color film substrate facing the liquid crystal layer. The common electrode layer includes a plurality of sensing electrodes, a plurality of driving electrodes, and a plurality of dummy electrodes located between the sensing electrodes and the driving electrodes. In addition, the sensing electrodes, the driving electrodes, and the dummy electrodes are insulated from one another.

15 Claims, 8 Drawing Sheets

(51) Int. Cl.
  *G02F 1/1343* (2006.01)
  *G06F 3/044* (2006.01)
  *G02F 1/139* (2006.01)

(52) U.S. Cl.
  CPC ............ G06F 3/044 (2013.01); G06F 3/0412 (2013.01); *G02F 1/1396* (2013.01); *G02F 2001/134318* (2013.01)

(56) References Cited

U.S. PATENT DOCUMENTS

| | | | | |
|---|---|---|---|---|
| 5,847,781 A * | 12/1998 | Ono | | G02F 1/13458 349/111 |
| 7,030,860 B1 * | 4/2006 | Hsu | | G06F 3/044 178/18.06 |
| 2004/0217945 A1 * | 11/2004 | Miyamoto | | G06F 3/0412 345/173 |
| 2005/0243023 A1 * | 11/2005 | Reddy | | G09G 3/2011 345/48 |
| 2006/0109222 A1 * | 5/2006 | Lee | | G02F 1/13338 345/88 |
| 2006/0145978 A1 * | 7/2006 | Takatori | | G09G 3/2014 345/87 |
| 2006/0290863 A1 * | 12/2006 | HoeSup | | G02F 1/134363 349/141 |
| 2007/0222762 A1 * | 9/2007 | Van Delden | | G06F 3/0412 345/173 |
| 2008/0062140 A1 * | 3/2008 | Hotelling | | G09G 3/3648 345/173 |
| 2008/0062148 A1 * | 3/2008 | Hotelling | | G02F 1/13338 345/174 |
| 2008/0084526 A1 * | 4/2008 | Yamanaka | | G02F 1/136209 349/111 |
| 2008/0143664 A1 * | 6/2008 | Nakagawa | | G02F 1/1368 345/92 |
| 2008/0180407 A1 * | 7/2008 | Utsunomiya | | G06F 3/0412 345/174 |
| 2008/0309627 A1 * | 12/2008 | Hotelling | | G02F 1/134363 345/173 |
| 2009/0079707 A1 * | 3/2009 | Kaehler | | G06F 3/044 345/174 |
| 2009/0195511 A1 * | 8/2009 | Cites | | G06F 3/044 345/173 |
| 2009/0213090 A1 * | 8/2009 | Mamba | | G06F 3/044 345/174 |
| 2009/0315854 A1 * | 12/2009 | Matsuo | | G06F 3/0412 345/174 |
| 2010/0045635 A1 * | 2/2010 | Soo | | G06F 3/046 345/178 |
| 2010/0060815 A1 * | 3/2010 | Yamada | | G02F 1/1345 349/39 |
| 2010/0144391 A1 * | 6/2010 | Chang | | G02F 1/13338 455/566 |
| 2010/0194697 A1 * | 8/2010 | Hotelling | | G06F 3/0412 345/173 |
| 2010/0194698 A1 * | 8/2010 | Hotelling | | G06F 1/3218 345/173 |
| 2010/0194699 A1 * | 8/2010 | Chang | | G06F 3/044 345/173 |
| 2010/0214247 A1 * | 8/2010 | Tang | | G06F 3/044 345/173 |
| 2010/0220075 A1 * | 9/2010 | Kuo | | G06F 3/044 345/174 |
| 2010/0265210 A1 * | 10/2010 | Nakanishi | | G09G 5/18 345/174 |
| 2011/0007030 A1 * | 1/2011 | Mo | | G06F 3/044 345/174 |
| 2011/0181560 A1 * | 7/2011 | Yamazaki | | H01L 27/1225 345/204 |
| 2011/0187677 A1 * | 8/2011 | Hotelling | | G06F 3/0412 345/174 |
| 2011/0234925 A1 * | 9/2011 | Tatara | | G09G 3/3233 348/800 |
| 2011/0267305 A1 * | 11/2011 | Shahparnia | | G06F 3/0412 345/174 |
| 2011/0273401 A1 * | 11/2011 | Moriwaki | | G02F 1/13338 345/174 |
| 2011/0275270 A1 * | 11/2011 | Matsuoka | | G02F 1/1345 445/2 |
| 2012/0038583 A1 * | 2/2012 | Westhues | | G06F 3/0412 345/174 |
| 2012/0056820 A1 * | 3/2012 | Corbridge | | G06F 3/044 345/174 |
| 2012/0105337 A1 * | 5/2012 | Jun | | G06F 3/0412 345/173 |
| 2012/0162104 A1 * | 6/2012 | Chang | | G06F 3/0412 345/173 |
| 2012/0229408 A1 * | 9/2012 | Yamamoto | | G06F 3/0412 345/173 |
| 2012/0268423 A1 * | 10/2012 | Hotelling | | G06F 3/0412 345/174 |
| 2012/0292628 A1 * | 11/2012 | Tian | | H01L 29/66765 257/72 |
| 2012/0305910 A1 * | 12/2012 | Hsieh | | H01L 27/1222 257/43 |
| 2012/0313881 A1 | 12/2012 | Ge et al. | | |
| 2013/0050130 A1 * | 2/2013 | Brown | | G06F 3/044 345/174 |
| 2013/0341651 A1 * | 12/2013 | Kim | | H01L 31/0232 257/84 |
| 2014/0092326 A1 * | 4/2014 | Zhou | | G06F 3/0412 349/12 |

FOREIGN PATENT DOCUMENTS

| | | |
|---|---|---|
| EP | 2075677 A2 | 7/2009 |
| EP | 2506128 A2 | 10/2012 |
| WO | WO2012/118513 A1 | 9/2012 |

* cited by examiner

TN LIQUID CRYSTAL DISPLAY DEVICE AND TOUCH CONTROL METHOD THEREOF

CROSS-REFERENCES TO RELATED APPLICATIONS

This application claims the benefit of priority to Chinese Patent Application No. 201210567635.0, entitled "TN LIQUID CRYSTAL DISPLAY DEVICE AND TOUCH CONTROL METHOD THEREOF", filed with the Chinese Patent Office on Dec. 24, 2012, the contents of which is incorporated herein by reference in its entirety.

TECHNICAL FIELD

The invention relates to liquid crystal display (LCD) technology, and in particular to a TN (twisted nematic) LCD device and a touch control method thereof.

BACKGROUND OF THE INVENTION

With the development of the liquid crystal display (LCD) technology, touch panels, as the most simple, convenient and natural way of human-machine interaction, are increasingly applied to the field of LCD. Depending on differences of the operational principle and media for transmitting information, the touch panels may be classified into four types: resistive touch panels, capacitive touch panels, infrared touch panels and surface acoustic wave touch panels. The capacitive touch panel technology is popular due to the simple process, long service life and high transmittance.

In the existing TN (twisted nematic) LCD device integrated with the touch control function, a touch panel is directly disposed on a TN LCD panel. Each of the LCD panel and the touch panel includes two substrates which are generally glass substrates. That is, the existing TN LCD device with the touch control function requires at least four glass substrates to be jointed together. In view of the requirements for thinner, more convenient display device at the right now and in the future, the TN LCD device with the touch control function mentioned above is inadequate considering its complex structure, great thickness, complex manufacturing process and high manufacturing costs, therefore, it's needful to reduce the manufacturing costs, simplify the manufacturing process and provide a lighter, thinner, more convenient display device with simple structure.

BRIEF SUMMARY OF THE INVENTION

One inventive aspect is a twisted nematic liquid crystal display device integrated with a touch control function. The device includes an array substrate, a color film substrate disposed opposite the array substrate, and a liquid crystal layer disposed between the array substrate and the color film substrate. The device also includes a common electrode layer disposed on a surface of the color film substrate facing the liquid crystal layer. The common electrode layer includes a plurality of sensing electrodes, a plurality of driving electrodes, and a plurality of dummy electrodes located between the sensing electrodes and the driving electrodes. In addition, the sensing electrodes, the driving electrodes, and the dummy electrodes are insulated from one another.

Another inventive aspect is a method of controlling a twisted nematic liquid crystal display device, for performing detection of touch signal. The method includes dividing a time-sharing period during display into a first duration and a second duration, where during the time-sharing period, the common electrode layer is configured to detect a touch signal and to provide a common electrode signal. The second duration is shorter than a retention time of liquid crystal molecules and is longer than or equal to a scanning time for one detection of the touch signal by the common electrode layer. In addition, the retention time of liquid crystal molecules is a time period during which the liquid crystal molecules maintain a previous state when a driving voltage of the common electrode layer changes. The method also includes, during the first duration, applying a same common potential to a plurality of sensing electrodes, to a plurality of driving electrodes, and to a plurality of dummy electrodes of the common electrode layer to achieve normal display. The method also includes, during the second duration, grounding the dummy electrodes and applying a driving voltage for touch detection to the sensing electrodes and to the driving electrodes of the common electrode layer.

DETAILED DESCRIPTION OF THE PREFERRED EMBODIMENTS

In order to make objects, technical solutions and advantages of embodiments of the present invention to be clearer, in the following the technical solutions according to the embodiments of the present invention will be clearly and fully described in conjunction with the drawings. Apparently, the embodiments to be described are only some of the embodiments of the present invention but not all the embodiments of the present invention. Any other embodiments obtained by the skilled in the art based on the embodiments of the present invention without inventive works fall within the protective scope of the present invention.

As described in the background of the present invention, the existing TN LCD device integrated with a touch control function requires at least four glass substrates, causing a greater thickness and a higher manufacturing cost of the TN LCD device.

In view of this, a TN LCD device is provided according to an embodiment of the present invention. The TN LCD device includes: an array substrate, a color film substrate disposed opposite to the array substrate, and a liquid crystal layer disposed between the array substrate and the color film substrate; a common electrode layer disposed on a surface of the color film substrate facing the liquid crystal layer, wherein the common electrode layer includes a plurality of sensing electrodes, a plurality of driving electrodes and a plurality of dummy electrodes located between the sensing electrodes and the driving electrodes, and the sensing electrodes, the driving electrodes and the dummy electrodes are insulated from each other.

In this embodiment, since the common electrode layer comprises a plurality of sensing electrodes, a plurality of driving electrodes and a plurality of dummy electrodes, the common electrode layer can perform functions of touch control. Therefore, a touch panel is saved, which allows the TN LCD device integrated with the touch control function to be lighter and thinner.

A control method of the TN LCD device for performing detection of touch signal during normal display, includes: dividing a time-sharing period during normal display into a first duration and a second duration. The time-sharing period refers to a period in which the common electrode layer performs detection of touch signal and provides common electrode signal. The second duration is shorter than the retention time of liquid crystal molecules and longer than or equal to the scanning time for one detection of touch signal performed by the common electrode layer. The retention time of liquid crystal molecules refers to the time duration in which the liquid crystal molecules maintain the previous state when a driving voltage of the common electrode layer changes. During the first duration, the sensing electrodes, driving electrodes and dummy electrodes of the common electrode layer are applied a same common potential to achieve normal display. During the second duration, a driving voltage of touch detecting is applied to the sensing electrodes and the driving electrodes of the common electrode layer and the dummy electrodes are grounded for the detection of touch signal.

According to the method, a common voltage and a driving voltage of touch detecting are sequentially applied to corresponding electrodes in the common electrode layer to achieve normal display and touch detection. Furthermore, it is guaranteed that the duration for the touch driving process is shorter than the retention time of liquid crystal molecules and longer than or equal to the scanning time for one detection of touch signal performed by the common electrode layer, so the normal display is maintained during the touch detection, namely, the touch detection is achieved during normal display.

The core ideas of the present invention are described above. In the following, the technical solutions according to embodiments of the present invention will be clearly, fully described in conjunction with the drawings. Apparently, the described embodiments are only some of but not all the embodiments of the present invention. Any other embodiments obtained by the skilled in the art based on the embodiments of the present invention without an inventive work may fall within the protective scope of the present invention.

First Embodiment

Figure 1:
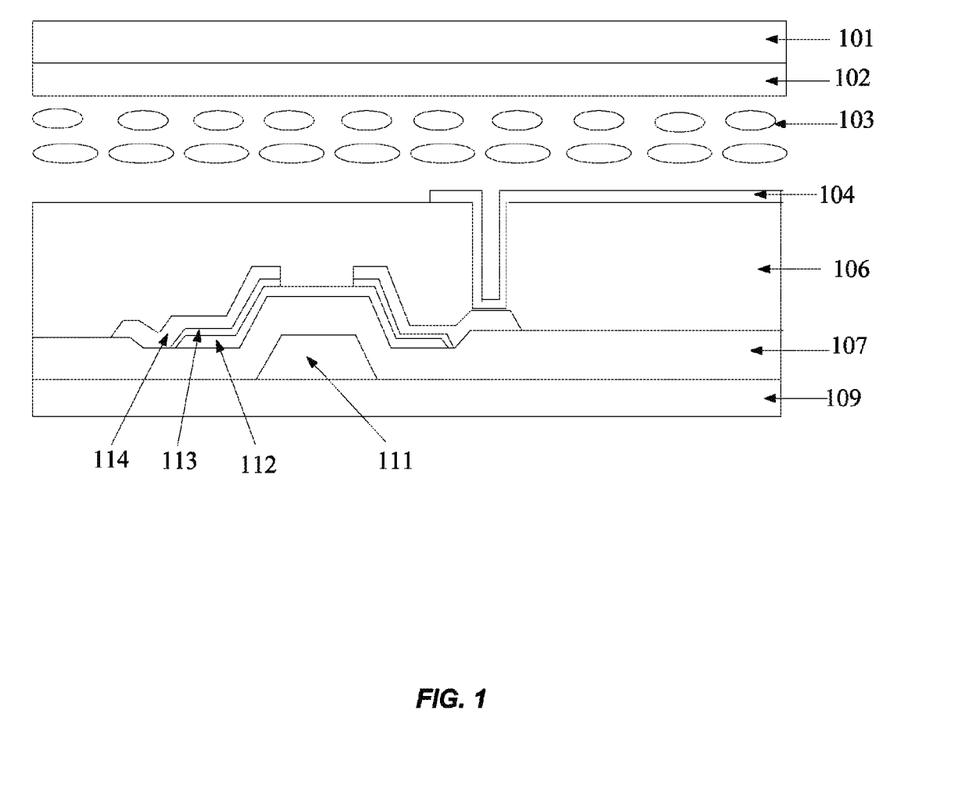
FIG. 1 is a schematic sectional diagram of a TN LCD device according to a first embodiment of the present invention.

A TN (twisted nematic) LCD device is disclosed according to the first embodiment of the present invention. As shown in the sectional view in FIG. 1, the LCD device includes:

an array substrate 109, a color film substrate 101 disposed opposite to the array substrate 109, and a liquid crystal layer 103 disposed between the array substrate 109 and the color film substrate 101; wherein the array substrate and the color film substrate are generally glass substrates;

a gate electrode layer 121 disposed on a surface of the array substrate 109 facing the liquid crystal layer 103, where the gate electrode layer 121 includes gate electrodes 111 and scanning lines (not shown), the scanning lines and the gate electrodes 111 are formed on a same conductive layer and electrically connected to each other, the scanning line is used to switch on/off of a thin film transistor (TFT), and the gate electrode layer 121 may be made of a metal or a transparent conductive material such as indium tin oxide;

a first insulating layer 107 disposed on the gate electrode layer 121, wherein the first insulating layer 107 is made of at least one of silicon nitride, silicon oxide and silicon oxynitride, and preferably is made of silicon nitride in this embodiment;

a silicon island disposed on the first insulating layer 107, wherein the silicon island includes a amorphous silicon layer 112 and a heavily doped amorphous silicon layer 113 both are located above the first insulating layer 107, and preferably the heavily doped amorphous silicon layer 113 is a N-type heavily doped amorphous silicon layer;

a source/drain electrode layer 114 disposed on the silicon island, wherein the source/drain electrode layer 114 includes source electrodes, drain electrodes and data lines, and the gate electrode within the gate electrode layer 121, the first insulating layer, the silicon island, the source electrode and the drain electrode form a TFT structure collectively;

a second insulating layer 106 disposed on the source/drain electrode layer 114 for isolating the source/drain electrode layer 114 from a pixel electrode layer;

the pixel electrode layer 104 disposed on the second insulating layer 106, wherein the pixel electrode layer 104 is a transparent conductive layer, which is made of indium tin oxide (ITO), indium zinc oxide (IZO) or the combination of ITO and IZO; the source electrode of the TFT is connected to the data line and the drain electrode of the TFT is connected to the pixel electrode to control the display of the pixel electrode; and a common electrode layer 102 disposed on a surface of the color film substrate 101 facing the liquid crystal layer, wherein the common electrode layer 102 includes a plurality of sensing electrodes, a plurality of driving electrodes and a plurality of dummy electrodes located between the sensing electrodes and the driving electrodes, the sensing electrodes, the driving electrodes and the dummy electrodes are insulated from each other.

According to this embodiment, the common electrode layer 102 may be preferably a transparent conductive layer, and be made of ITO, IZO or the combination of ITO and IZO.

Figure 2:
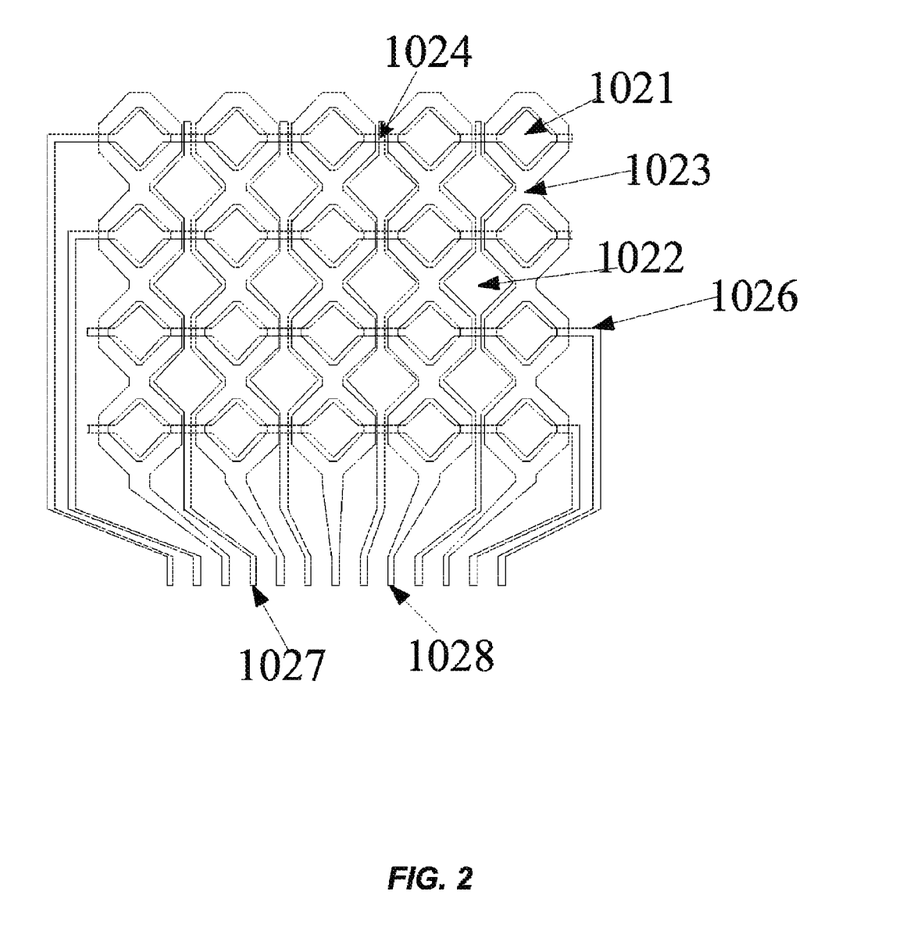
FIG. 2 is a plan view of a common electrode layer according to the first embodiment of the present invention.

The plan view of the common electrode layer 102 according to this embodiment is shown in FIG. 2. The driving electrodes 1021 and the sensing electrodes 1022 are rhombic electrodes arranged in an array. A dummy electrode 1023 is disposed between a driving electrode 1021 and a sensing electrode 1022 which are adjacent to each other. The dummy electrode 1023 is a hollowed-out rhombic electrode having a hollowed-out part in which a driving electrode 1021 or a sensing electrode 1022 is disposed. Specifically, taking the first right column in FIG. 2 as an example, driving electrodes 1021 are disposed in the hollowed-out parts of the dummy electrodes 1023; and taking the second right column in FIG. 2 as an example, sensing electrode 1022 are disposed in the hollowed-out parts of the dummy electrodes 1023.

Figure 11:
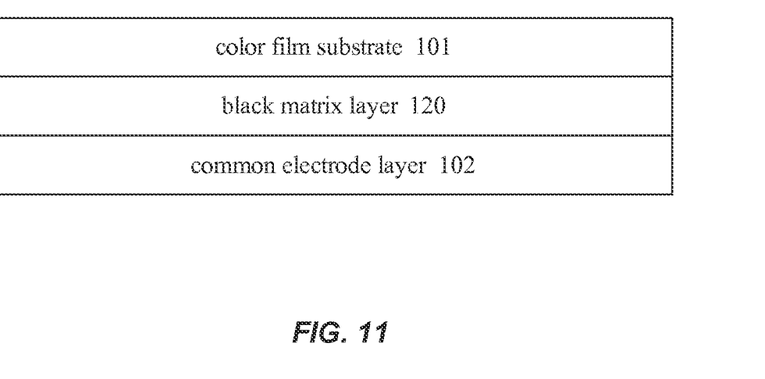
FIG. 11 is a schematic sectional diagram showing a black matrix layer in the TN LCD device according to an embodiment of the present invention.

The driving electrode 1021, the sensing electrode 1022 and the dummy electrode 1023 are isolated and insulated from each other by gaps between any two of them. In this embodiment, the gaps are preferably overlapped with a black matrix layer 120 (as shown in FIG. 11) on the color film substrate in order to further improve the aperture ratio of the LCD device. That is, the black matrix layer 120, located between the color film substrate and the common electrode layer, may cover the gaps.

According to the embodiment, a plurality of driving electrodes 1021 in a same row are connected to one another through a first wiring to form a driving line 1026, and a plurality of sensing electrodes 1022 in a same column are connected to one another through a second wiring to form a sensing line 1027. Since the first wiring is inevitably intersected with the second wiring, one of the first wiring and the second wiring must connect to the corresponding electrodes in a form of a conductive bridging in order to guarantee that the first wiring and the second wiring are insulated from each other.

Specifically, the plurality of driving electrodes 1021 are connected in such a way that the common electrode layer 102 and the first wirings for electrically connecting the driving electrodes to one another are on a same conductive layer, and meanwhile the plurality of sensing electrodes 1022 are connected in such a way that the second wirings for electrically connecting the sensing electrodes 1022 are conductive bridgings 1024 which are on a different conductive layer from the common electrode layer 102. Alternatively, the plurality of sensing electrodes 1022 are connected in such a way that the common electrode layer 102 and the second wirings for electrically connecting the sensing electrodes 1022 to one another are on a same conductive layer, and meanwhile the plurality of driving electrodes 1021 are connected in such a way that the first wirings for electrically connecting the driving electrodes 1021 are conductive bridgings 1024 which are on a different conductive layer from the common electrode layer.

To facilitate the applying of a same potential to all the electrodes of the common electrode layer simultaneously for implementing normal display, in the embodiment, all the dummy electrodes 1023 are electrically connected to one another. For the connection of a column of dummy electrodes perpendicular to the driving line 1026, the dummy electrodes at the intersection with the driving line 1026 need to be electrically connected to the conductive bridging which is on a different conductive layer from the common electrode layer 102. For the connection of a row of dummy electrodes perpendicular to the sensing line 1027, the dummy electrodes at the intersection with the sensing line 1027 need to be electrically connected to the conductive bridging which is on a different conductive layer from the common electrode layer 102.

In other words, the dummy electrodes in a same row or a same column are electrically connected to one another via a third wiring to form a dummy electrode line 1028, and the third wiring is a conductive bridging on a different conductive layer from the common electrode layer 102. Thereafter, all the dummy electrode lines 1028 are applied a same potential or all the dummy electrode lines 1028 are extended through a same electrode lead, so that all the dummy electrodes 1023 are electrically connected together.

It is to be understood by those skilled in the art that the arrangement of the driving electrodes and the sensing electrodes may be interchangeable. In the embodiment, explanation is made by taking the case that the driving lines are arranged in the horizontal direction and the sensing lines are arranged in the vertical direction as an example. In other embodiments, the driving lines may be arranged in the vertical direction and the sensing lines may be arranged in the horizontal direction. That is, driving electrodes 1021 in a same column are connected to one another through the first wiring to form a driving line and sensing electrodes 1022 in a same row are connected to one another through the second wiring to form a sensing line.

Second Embodiment

Figure 3:
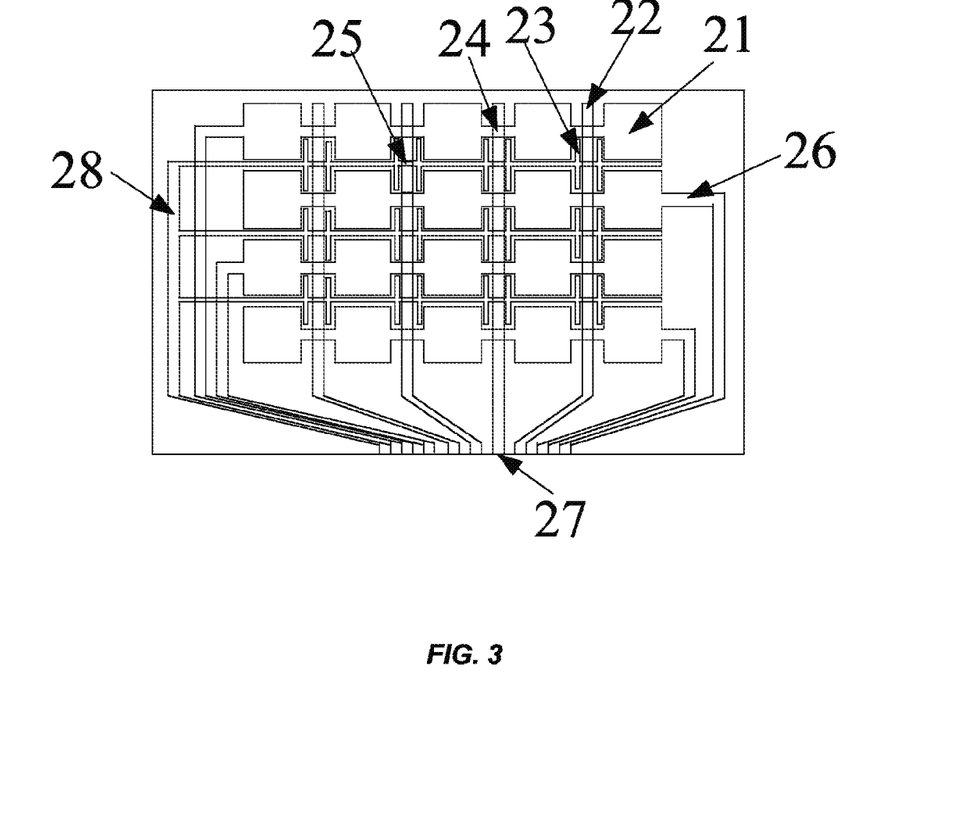
FIG. 3 is a plan view of a common electrode layer according to a second embodiment of the present invention.

Different from the structure of the common electrode layer of the TN LCD device disclosed in the above embodiment, the plan view of the common electrode layer 102 of the TN LCD device according to the second embodiment of the present invention is shown in FIG. 3. A plurality of driving electrodes 21 are square electrodes arranged in an array, and strip-shaped sensing electrodes 22 are disposed between every two adjacent columns of driving electrodes. A dummy electrode 23 is disposed between a driving electrode 21 and a sensing electrode 22 adjacent to each other. Each of the dummy electrodes 23 is in a H shape and the H-shaped dummy electrodes in each row are connected to one another.

Similar to the first embodiment, driving electrodes 21 in a same row are connected to one another through a first wiring to form a driving line 26, strip-shaped sensing electrodes 22 in a same column are connected to one another through a second wiring to form a sensing line 27 and dummy electrodes 23 in a same row are connected to one another through a third wiring to form a dummy electrode line 28. Furthermore, in this embodiment, all the dummy electrodes 23 are electrically connected to one another. As shown in FIG. 3, dummy electrode lines 28 in different rows are extended through a same electrode lead in order to apply a same voltage to all the dummy electrodes simultaneously.

Since the first wiring is intersected with the second wiring, one of them is located on a same conductive layer as the common electrode layer 102 and the other is inevitably a conductive bridging which is on a different conductive layer from the common electrode layer 102. That is, the intersection 24 of the first wiring with the second wiring is inevitably configured in a conductive bridging structure. Similarly, since the second wiring is intersected with the third wiring, one of them is on a same conductive layer as the common electrode layer 102 and the other is inevitably a conductive bridging on a different conductive layer from the common electrode layer 102.

Due to a smaller width of the intersection 25 of the H-shaped dummy electrode 23 and the strip-shaped sensing electrode 22, the third wiring is preferably on a same conductive layer as the common electrode layer 102, that is, the strip-shaped sensing electrodes 22 are electrically connected to one another through conductive bridgings, to reduce the complexity of forming through-holes for bridgings.

Of course, the shape of the driving electrode may be exchanged with the shape of the sensing electrode. In other words, the plurality of driving electrodes are square electrodes arranged in an array, strip-shaped sensing electrodes are disposed between every two adjacent columns of driving electrodes, and the dummy electrode is disposed between the driving electrode and the sensing electrode adjacent to each other. Each of the dummy electrodes is in a H shape and the H-shaped dummy electrodes in each row are connected to one another. Furthermore, the arrangement of the driving electrodes may be exchanged with the arrangement of the sensing electrodes, that is, driving electrodes in a same column are connected to one another through the first wiring to form a driving line and sensing electrodes in a same row are connected to one another through the second wiring to form a sensing line.

In the above embodiment, the common electrode layer 102 on the color film substrate includes a plurality of sensing electrodes, a plurality of driving electrodes and a plurality of dummy electrodes, wherein the common electrode layer 102 can perform functions of touch panel. Therefore, the touch panel is saved and the LCD is lighter and thinner as compared to the prior technology.

It is to be noted that the common electrode layer 102 in this embodiment is further adapted to perform detection of touch signal in additional to normal display. Except for the shapes and structures according to the first embodiment and the second embodiment, other structures may be adopted for the common electrode layer 102, such as the conventional rhombic electrode structure in which no dummy electrode is provided, as long as the most areas of the common electrode layer 102 are conductive while achieving the function of touch detection.

Third Embodiment

Based on the TN LCD device disclosed in each of the above two embodiments, the TN LCD device integrated with the touch control function disclosed in this embodiment performs detection of touch signal by the principle of touch detection preferably in a capacitive touch panel. The capacitive touch panel may determine whether a touch occurs and detect the position of the occurring touch through detecting changes in the mutual capacitance between the sensing electrodes and the driving electrodes.

Figure 4:
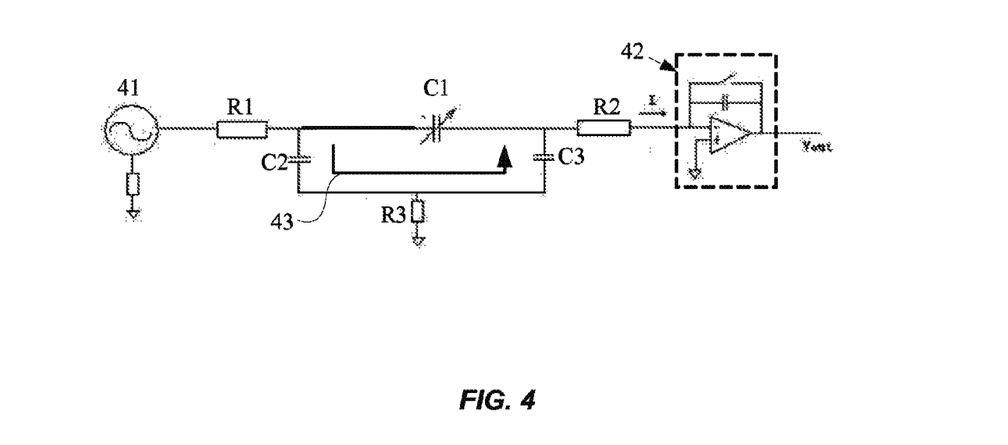
FIG. 4 is a schematic diagram showing a certain principle of touch detection in a capacitive touch panel.

The principle of touch detection in the capacitive touch panel is shown in FIG. 4. A driving signal is applied to the driving electrode by the signal source 41, and a detecting circuit 42 is used for signal detection. When a pointing object (generally a finger) touch the surface of the touch panel, there exists a current flowing into the finger, and ideally only the capacitance value of the mutual capacitor C1 between the sensing electrode and driving electrode is changed, and then the minor change of the current caused by the change of the mutual capacitor C1 is detected by the detecting circuit 42, thus the position where the touch occurs is determined.

In this embodiment, most areas of the common electrode layer 102 are disposed with conducting electrodes, and when the conducting electrodes are used for touch detection, parasitic capacitors inevitably exist between the common electrode layer 102 with any one of the pixel electrodes, the data lines, the scanning lines and the lower COM (located on a surface of the array substrate facing the liquid crystal layer, and used to form storage capacitors with the pixel electrodes). The parasitic capacitors formed between the driving electrodes of the common electrode layer 102 and any of the structures listed above are driving parasitic capacitors C2, and the parasitic capacitors formed between the sensing electrodes and any of the structures listed above are sensing parasitic capacitors C3.

Accordingly, in practical operation, when the signal source 41 sends an AC signal, the AC signal is sent into the detecting circuit 42 through a driving electrode resistor R1, the mutual capacitor C1 and an sensing electrode resistor R2; while the greater driving parasitic capacitor C2 and sensing parasitic capacitor C3 have smaller capacitive reactance with respect to the AC signal sent from the signal source 41, and respective equivalent resistor R3 and inductor of the data line and the scanning line may prevent the AC signal from flowing into the ground; thus the AC signal is allowed to sequentially pass through the driving parasitic capacitor C2 and the sensing parasitic capacitor C3, which form a current channel 43. After the AC signal passes through the current channel 43, a great basal signal (noise signal) is formed at the detecting circuit 42. Furthermore, since the signal corresponding to the change in the capacitance of mutual capacitor C1 is generally minor and tends to be submerged in the greater basal signal, it is difficult to detect the signal corresponding to the change in the capacitance of mutual capacitor C1 by the detecting circuit 42, causing failure in detection and decrease in the sensitivity of the touch control sensitivity of the LCD device.

Figure 6:
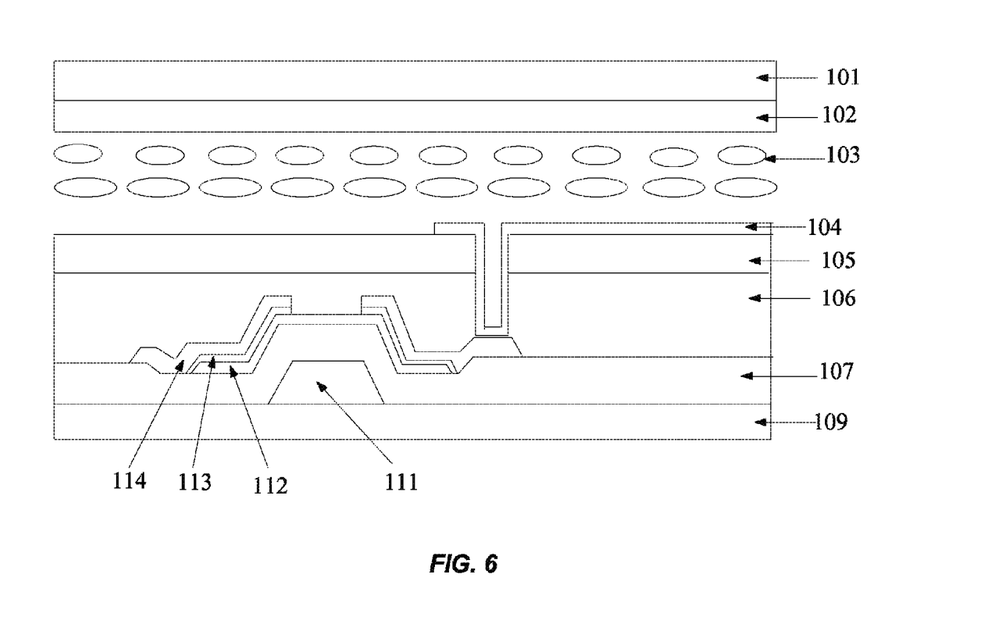
FIG. 6 is a schematic sectional diagram of a TN LCD device according to a third embodiment of the present invention.

In order to improve the sensitivity in touch control of the LCD device, as shown in FIG. 6, the LCD device may further include a third insulating layer 105 disposed between the second insulating layer 106 and the pixel electrode layer 104. The third insulating layer 105 may be an organic film, and the thickness J of the organic film may be limited as following: 1 µm<=J<=10 µm.

The presence of the third insulating layer 105 functions to increase the distance between the two plates of the parasitic capacitor, thus the capacitances of the driving parasitic capacitor C2 and the sensing parasitic capacitor C3 are reduced, the capacitance change caused from the presence of the parasitic capacitor when the touch occurs is reduced in turn, and the noise is reduced, resulting in the improvement of sensitivity in touch control of the LCD device.

Fourth Embodiment

Figure 7:
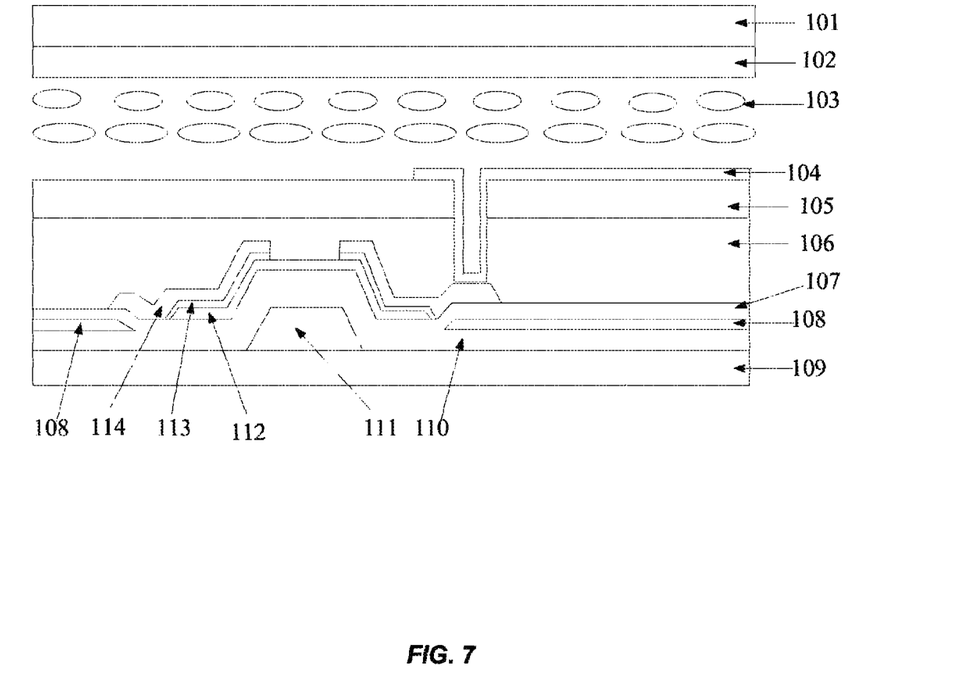
FIG. 7 is a schematic sectional diagram of a TN LCD device according to a fourth embodiment of the present invention.
Figure 12:
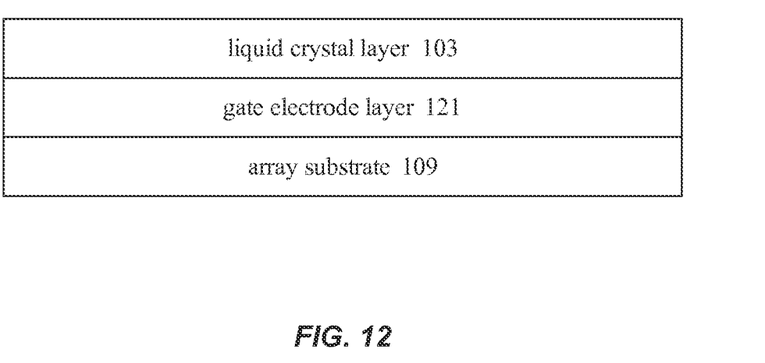
FIG. 12 is a schematic sectional diagram showing a gate electrode layer in the TN LCD device according to an embodiment of the present invention.

In order to further reduce the effect of the parasitic capacitor on touch detection, as shown in FIG. 7, different from the above embodiments, the TN LCD device according to the fourth embodiment further includes: a first transparent electrode layer 108 disposed between the first insulating layer 107 and the gate electrode layer 121 as shown in FIG. 12, where the first transparent electrode layer 108 covers the scanning lines of the gate electrode layer 121 but does not cover an area of the gate electrodes at the gate electrode layer 121, and does not affect the normal operation of the TFTs; a fourth insulating layer 110 disposed between the first transparent electrode layer 108 and the gate electrode layer 121 is used for isolating the gate electrode layer 121 from the first transparent electrode layer 108.

Preferably, the first transparent electrode layer 108 is partially overlapped with the pixel electrodes to form storage capacitors with the pixel electrodes. That is, the first transparent electrode layer 108 servers as the lower COM of the LCD device and there is no need to additionally form the lower COM.

It is to be noted that the first transparent electrode layer 108 in this embodiment is arranged opposite to the common electrode layer 102, and plan views of the areas of the first transparent electrode layer 108 and the common electrode layer 102 which are opposite to each other are the same (namely in the area where the first transparent electrode layer 108 does not cover the TFTs), except for the area of the TFTs.

Figure 8:
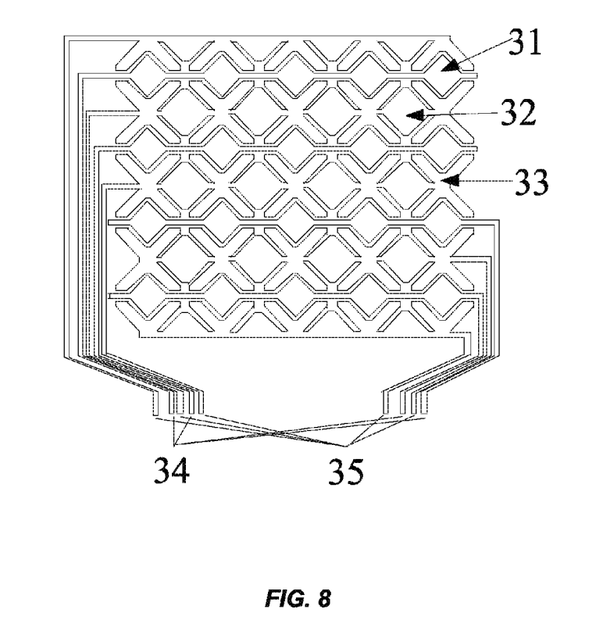
FIG. 8 is a schematic plan view of a first transparent electrode layer according to the fourth embodiment of the present invention.

Taking the common electrode layer 102 disclosed in the first embodiment as an example, the plan view of the first transparent electrode layer 108 according to the fourth embodiment is shown in FIG. 8. Each of the dummy electrode blocks 33 in a same row on the first transparent electrode layer 108 is electrically connected to a sensing electrode block 32 in the hollowed-out part of the dummy electrode block 33 through a fourth wiring which is on a same conductive layer as the first transparent electrode layer 108. The dummy electrode blocks 33 and sensing electrode blocks 32 are leaded to a non-display area of the LCD device through second electrode leads 35.

The driving electrode blocks 31 in a same row on the first transparent electrode layer 108 are electrically connected to one another through a fifth wiring which is on a same conductive layer as the first transparent electrode layer 108, and the driving electrode blocks in respective rows are leaded to the non-display area of the LCD device through first electrode leads 34. That is, it is not necessary to use conductive bridgings for the connecting the electrode blocks to each other on the first transparent layer 108.

Fifth Embodiment

Figure 9:
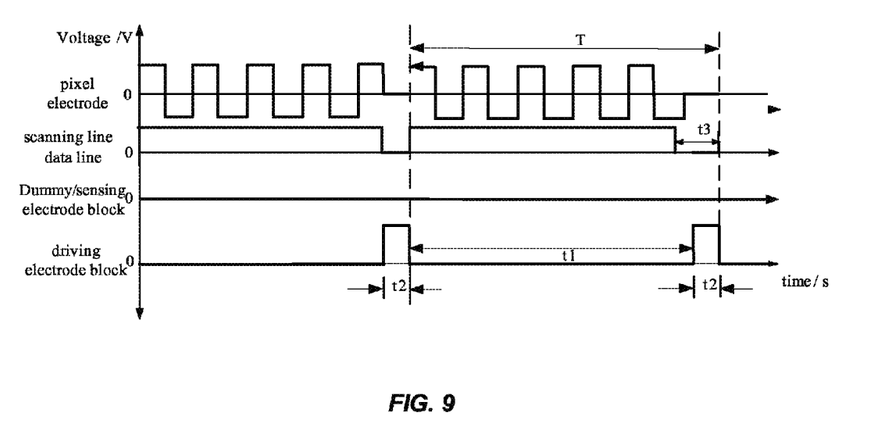
FIG. 9 is a schematic diagram showing the control means for electrodes of a TN LCD device according to a fifth embodiment of the present invention.
Figure 10:
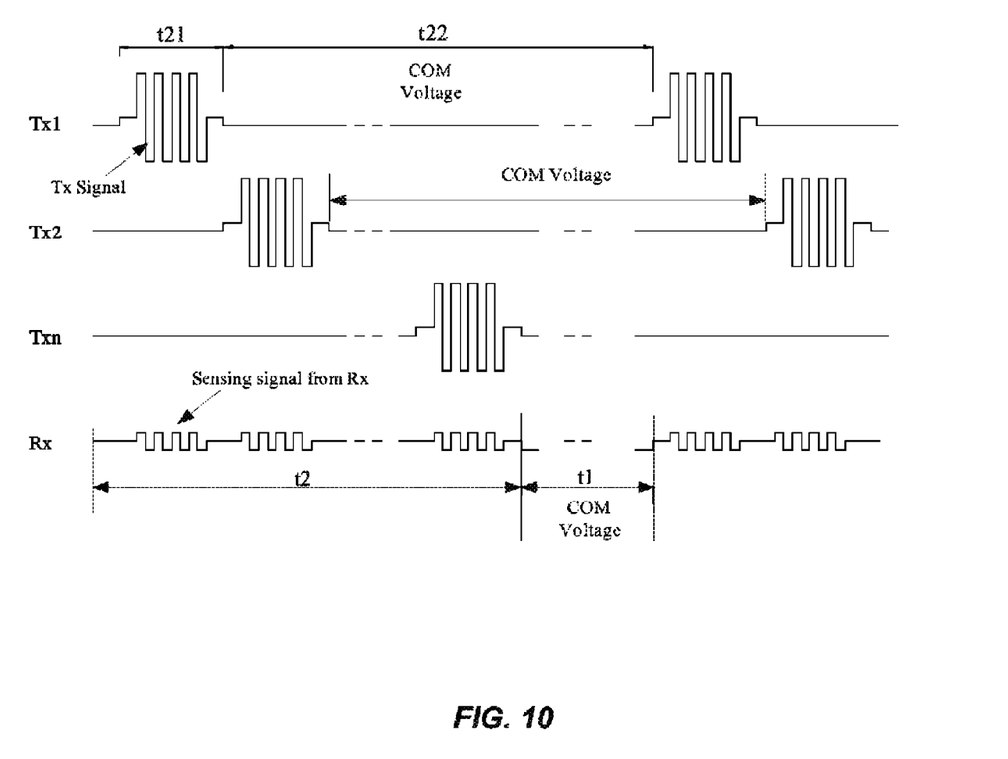
FIG. 10 is a schematic diagram showing the control means for driving electrodes and sensing electrodes on a common electrode layer of a TN LCD device according to the fifth embodiment of the present invention.

Taking the TN LCD device disclosed in the fourth embodiment as an example, the control method of the TN-type LCD device is disclosed according to the fifth embodiment. The control method is used to implement touch detection during normal display. The schematic diagram showing the means for performing control of the pixel electrodes, the scanning lines, the data lines, and individual electrodes on the first transparent conductive layer 108 is shown in FIG. 9, and the schematic diagram showing the control of the driving electrodes and sensing electrodes of the common electrode layer is shown in FIG. 10. In combination of the structure of the mentioned above TN-type LCD device, the method includes:

dividing a time-sharing period T during normal display into a first duration t1 and a second duration t2, where the time-sharing period is a period during which the common electrode layer 102 performs detection of touch signal and provides common electrode signal; the first duration t1 is the time duration for normal display and the second duration t2 is the time duration for touch driving.

It is to be noted that the length of the time-sharing period is not limited, as long as one complete touch detection can be accomplished in one time-sharing period. Generally, the time-sharing period has an equal length as the scanning period of the LCD device, namely the length of the time-sharing period generally equals to the reciprocal of the driving frequency of the LCD device.

Specifically, the second duration is shorter than the retention time of liquid crystal molecules and longer than or equal to the scanning time for one detection of touch signal performed by the common electrode layer (hereinafter referred to as touch scanning time, namely, the second duration t2), in order to guarantee that at least one touch scan can be performed during the second duration. Therefore, touch detection may be achieved when normal display is maintained.

It is to be noted that liquid crystal molecules have the characteristics of retention, that is, the inter-electrode capacitor may not disappear at once after the voltage applied to the liquid crystal molecules disappears, and the steering angle of the liquid crystal molecules may not be recovered to the original state and may be maintained until a voltage is applied again to the liquid crystal molecules. The retention time of liquid crystal molecules described in this embodiment is the time period in which the liquid crystal molecules maintain the previous state when the driving voltage of the common electrode layer 102 changes. In this embodiment, the first duration t1 is preferably greater than half of the duration of the time-sharing period and the second duration t2 is less than half of the duration of the time-sharing period.

Moreover, since the retention time t3 of liquid crystal molecules is often constant, generally about 8 ms, and the time for one touch scanning of the common electrode layer is about 3 ms, accordingly in this embodiment the second duration is preferably less than 8 ms and more preferably is 3 ms.

In the first duration, the driving electrodes 1021, sensing electrodes 1022 and dummy electrodes 1023 are applied a same common potential to achieve normal display. At this time, the pixel electrodes, scanning lines and data lines on the array substrate are driven in the normal display mode, and storage capacitors are formed between the first transparent electrode layer 108 and the pixel electrodes. Since the potential of the pixel electrodes during the normal display process is not zero, preferably respective electrodes on the first transparent electrode layer 108 are always grounded;

It is to be noted, during the first duration t1, in order to prevent the ageing of the liquid crystal operating under the driving voltage in a same direction for a long time, the driving voltage applied to the pixel electrodes needs to change over time and the duration of the same voltage level should be less than the ageing time of the liquid crystal. Preferably, in this embodiment the driving voltage applied to the pixel electrodes is in the form of square wave, and the polarity of the square wave is changed in an alternating way with respect to the grounding state (zero potential in this embodiment). The manner for applying voltage to the scanning lines and the data lines is the same as that for the conventional display drive in the prior art, and will not be described here. FIG. 9 is only used to show that the potentials of the scanning lines and the data lines are not zero during normal display.

During the second duration t2, a driving voltage of touch detecting is applied to the sensing electrodes 1022 and driving electrodes 1021 of the common electrode layer 102 and the dummy electrodes 1023 are grounded for detection of touch signal.

It is to be noted that during the second duration t2, the potential of the pixel electrodes is floating (may not be zero) and the power supply to the scanning lines and data lines is stopped; the parts in which the first transparent electrode layer 108 opposite to the driving electrodes 1021 (i.e., the areas of the driving electrode blocks 31 on the first transparent electrode layer 108) are connected to a same signal as the corresponding driving electrodes 1021, and the parts on the first transparent electrode layer 108 corresponding to the sensing electrodes 1022 and dummy electrodes 1023 (i.e., the areas of the sensing electrode blocks 32 and the dummy electrode blocks 33 on the first transparent electrode layer 108) are grounded.

Specifically, the control for the driving electrodes and sensing electrodes of the common electrode layer will be explained in conjunction with FIG. 10. Tx indicates the driving line formed by electrically connecting the driving electrodes in a same row of the common electrode layer, Rx indicates the sensing line formed by electrically connecting the sensing electrodes in a same column of the common electrode layer. The horizontal coordinate indicates time and the vertical coordinate indicates voltage.

During the second duration t2, driving voltages (i.e., the Tx signals shown in FIG. 10) are sequentially applied to individual driving lines (i.e., from driving line Tx2 to driving line Txn), and sensing signals are obtained by corresponding sensing lines Rx. Thereafter, the sensing signals are detected by the detecting circuit to determine the position where the touch occurs. Taking the driving line Tx1 as an example, a driving voltage is applied to the driving line Tx1 during time duration t21, and then a common voltage (i.e., COM voltage) is applied to the driving line Tx1 during time duration t22. Similarly, the driving voltages and the common voltage are sequentially applied to the driving lines (from driving line Tx2 to driving line Txn), to achieve the touch detection. During the first duration t1, the common voltage is simultaneously applied to all the driving lines, sensing lines and dummy electrode lines of the common electrode layer to achieve normal display.

Figure 5:
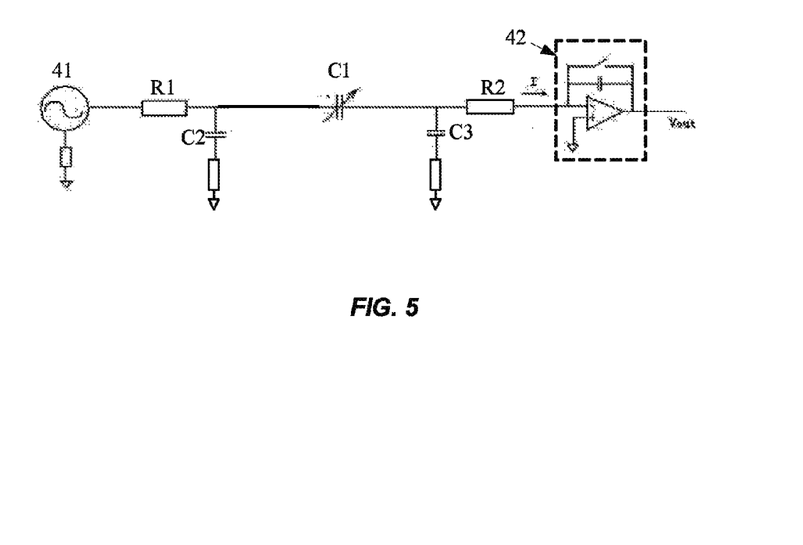
FIG. 5 is a schematic diagram showing another principle of touch detection in a capacitive touch panel.

In conjunction with FIG. 4, FIG. 5 and FIG. 7, the parasitic capacitor between the common electrode layer 102 and the pixel electrode layer 104 will be analyzed. The mechanism of the parasitic capacitor affecting the detection process of the detection circuit 42 is that the charge-discharge process of the parasitic capacitor affects the charge-discharge of the mutual capacitor by the signal voltage which is provided by the signal source 41. Since the quantity of electricity of the pixel electrode is constant when the pixel electrode is floating, the floating pixel electrode can not be charged-discharged in the touch detection process. The floating pixel electrode will not be taken into account when the driving parasitic capacitance and sensing parasitic capacitance are calculated, because the floating electrode only affects the quantity of electricity and voltage of parasitic capacitor and does not affect the capacitance variation of parasitic capacitor, thus reducing the intensity of noise at the detecting circuit 42.

Next, the parasitic capacitor between the common electrode layer 102 and the first transparent electrode layer 108 will be analyzed. In the touch detection process, the potential applied to the driving electrode block 31 of the first transparent electrode layer 108 is the same as that applied to a driving electrode 1021 of the corresponding the common electrode layer 102, which is equivalent to apply a same potential to the two plates of the driving parasitic capacitor. Therefore, there is no current flowing through the driving parasitic capacitor, thus the effect of driving parasitic capacitor on the current variation measured by the detecting circuit is further eliminated.

Furthermore, since driving electrode block 31, the sensing electrode block 32 and the dummy electrode block 33 of the first transparent electrode layer 108 are isolated and separated from each other, and also the driving electrode 1021, the sensing electrode 1022 and the dummy electrode 1023 of the common electrode layer 102 are isolated and separated from each other, the channel of the driving parasitic capacitor formed between driving electrode 1021 and the driving electrode block 31 and the channel of the sensing parasitic capacitor formed between the sensing electrode 1022 and the sensing electrode block 32 are opened, as shown in FIG. 5, the current path 43 in the FIG. 4 is grounded, thus significantly reducing the AC signal sent by the signal source 41 which reaches the detecting circuit 42 through the driving parasitic capacitor C2 and the sensing parasitic capacitor C3, significantly reducing the intensity of basal signal formed at the detecting circuit 42 and improving the accuracy of the touch detection.

Next, the parasitic capacitor between the common electrode layer 102 and the scanning lines, and the parasitic capacitor between the common electrode layer 102 and data lines will be analyzed. Since the first transparent electrode layer 108 covers the scanning lines completely, the effect of signal variations in the scanning lines and data lines on the common electrode layer 102 are shielded, and thus the intensity of basal signal formed at the detecting circuit 42 is further reduced and the accuracy of the touch detection is improved.

Sixth Embodiment

Different from the above embodiments, the first transparent electrode layer of the TN LCD device disclosed in this embodiment is disposed between the second insulating layer 106 and the third insulating layer 105, and the first transparent electrode layer covers the data lines and the scanning lines but does not cover the area of the TFTs.

The control method of the TN-type LCD device is the same as that disclosed in above embodiments, and difference between this embodiment and the above embodiments lies in that, since the first transparent electrode layer covers the data lines and the scanning lines, with regard to the parasitic capacitor between the common electrode layer 102 and the data lines and the parasitic capacitor between the common electrode layer 102 and the scanning lines, the first transparent electrode layer may shield effects of the data lines and scanning lines on the common electrode layer 102 due to the fact that the potential applied to the driving electrode block 31 of the first transparent electrode layer is same as that applied to the driving electrode 1021, therefore, the intensity of the basal signal formed at the detecting circuit 42 is further reduced to improve the accuracy of the touch detection.

The description of respective parts in the specification is made in a progressive way, each part focuses on a difference from the other parts, and the sameness between one part and other parts may be referred to by each other.

With the above descriptions of the disclosed embodiments, the skilled in the art may practice or use the present invention. Various modifications to the embodiments are apparent for the skilled in the art. The general principle suggested herein can be implemented in other embodiments without departing from the spirit or scope of the present invention. Therefore, the present invention should not be limited to the embodiments disclosed herein, but has the widest scope that is conformity with the principle and the novel features disclosed herein.

What is claimed is:

1. A twisted nematic liquid crystal display device integrated with a touch control function, the device comprising:
   an array substrate;
   a color film substrate disposed opposite the array substrate;
   a liquid crystal layer disposed between the array substrate and the color film substrate; and
   a common electrode layer disposed on a surface of the color film substrate facing the liquid crystal layer,
      wherein the common electrode layer comprises:
   a plurality of sensing electrodes,
   a plurality of driving electrodes, a plurality of dummy electrodes located between the sensing electrodes and the driving electrodes, wherein the sensing electrodes, the driving electrodes, and the dummy electrodes are insulated from one another;

a black matrix layer located between the color film substrate and the common electrode layer, wherein the sensing electrodes, the driving electrodes and the dummy electrodes are isolated and insulated from each other by gaps in the common electrode layer, and the gaps are covered by the black matrix layer;

a gate electrode layer disposed on a surface of the array substrate facing the liquid crystal layer, wherein the gate electrode layer comprises gate electrodes and scanning lines;

a first insulating layer disposed on the gate electrode layer;

a silicon island disposed on the first insulating layer;

a source/drain electrode layer disposed on the silicon island, wherein the source/drain electrode layer comprises source electrodes, drain electrodes and data lines, wherein the gate electrode within the gate electrode layer, the first insulating layer, the silicon island, the source electrode, and the drain electrode collectively form a thin film transistor structure;

a second insulating layer disposed on the source/drain electrode layer;

a third insulating layer disposed on the second insulating layer;

a pixel electrode layer disposed on the third insulating layer;

a first transparent electrode layer disposed between the first insulating layer and the gate electrode layer, wherein the first transparent electrode layer covers the scanning lines of the gate electrode layer and does not cover an area of the gate electrodes at the gate electrode layer; and a fourth insulating layer disposed between the first transparent electrode layer and the gate electrode layer.

2. The twisted nematic liquid crystal display device according to claim 1, wherein:

the driving electrodes in a particular row are connected to one another through a first wiring to form a driving line, and the sensing electrodes in a particular column are connected to one another through a second wiring to form a sensing line; or the driving electrodes in a particular column are connected to one another through a first wiring to form a driving line, and the sensing electrodes in a particular row are connected to one another through a second wiring to form a sensing line.

3. The twisted nematic liquid crystal display device according to claim 2, wherein:

the common electrode layer and the first wiring for electrically connecting the driving electrodes to one another are on a same conductive layer, and the second wiring for electrically connecting the sensing electrodes to one another is a conductive bridging which is on a different conductive layer from the common electrode layer; or the common electrode layer and the second wiring for electrically connecting the sensing electrodes to one another are on a same conductive layer, and the first wiring for electrically connecting the driving electrodes to one another is a conductive bridging which is on a different conductive layer from the common electrode layer.

4. The twisted nematic liquid crystal display device according to claim 2, wherein the driving electrodes and sensing electrodes are rhombic and are arranged in an array, the dummy electrode are disposed between the driving electrode and the sensing electrode adjacent to each other, and the dummy electrode is a hollowed-out rhombic electrode having a hollowed-out part in which driving electrode or sensing electrode is disposed.

5. The twisted nematic liquid crystal display device according to claim 4, wherein the dummy electrodes in a particular row or in a particular column are electrically connected to one another through a conductive bridging which is on a different conductive layer from the common electrode layer.

6. The twisted nematic liquid crystal display device according to claim 1, wherein the dummy electrodes are electrically connected to one another.

7. The twisted nematic liquid crystal display device according to claim 1, wherein:

the plurality of driving electrodes are square and are arranged in a array, strip-shaped sensing electrodes are disposed between every two adjacent columns of driving electrodes, the dummy electrodes are disposed between the driving electrode and the sensing electrode adjacent to the driving electrode, each of the dummy electrodes is in an H shape, and the H-shaped dummy electrodes in each row are connected to one another; or the plurality of sensing electrodes are square electrodes arranged in an array, strip-shaped driving electrodes are disposed between every two adjacent columns of sensing electrodes, the dummy electrodes are disposed between the sensing electrode and the driving electrode adjacent to the driving electrode, each of the dummy electrodes is in an H-shape, and the H-shaped dummy electrodes in each row are connected to one another.

8. The twisted nematic liquid crystal display device according to claim 7, wherein the dummy electrodes in a particular row are electrically connected to one another through a third wiring, and the common electrode layer and the third wiring are on a same conductive layer.

9. The twisted nematic liquid crystal display device according to claim 1, wherein the first transparent electrode layer is disposed opposite the common electrode layer, and plan views of the areas of the first transparent electrode layer and the common electrode layer which are opposite to each other are the same except for an area of the thin film transistors.

10. The twisted nematic liquid crystal display device according to claim 9, wherein the dummy electrode block of the first transparent electrode layer is connected to the sensing electrode block which is located in a hollowed-out part of the dummy electrode block.

11. A method of controlling a twisted nematic liquid crystal display device, for performing detection of touch signal, the method comprising:

dividing a time-sharing period during display into a first duration and a second duration, wherein during the time-sharing period, the common electrode layer is configured to detect a touch signal and to provide a common electrode signal, wherein the second duration is shorter than a retention time of liquid crystal molecules and is longer than or equal to a scanning time for one detection of the touch signal by the common electrode layer, and wherein the retention time of liquid crystal molecules is a time period during which the liquid crystal molecules maintain a previous state when a driving voltage of the common electrode layer changes;

during the first duration, applying a same common potential to a plurality of sensing electrodes, to a plurality of driving electrodes, and to a plurality of dummy electrodes of the common electrode layer to achieve normal display;

during the second duration, grounding the dummy electrodes and applying a driving voltage for touch detection to the sensing electrodes and to the driving electrodes of the common electrode layer;

wherein during the first duration of the time-sharing period, a first transparent electrode layer is grounded, wherein during the second duration, parts of the first transparent electrode layer opposite the driving electrodes and the corresponding driving electrodes are applied a same signal, and parts of the first transparent electrode layer opposite the sensing electrodes and the dummy electrodes are grounded.

12. The control method of claim 11, wherein the duration of the time-sharing period is equal to the duration of a scanning period of the liquid crystal display device.

13. The control method of claim 12, wherein the duration of the first duration is greater than half of the duration of the time-sharing period, and the duration of the second duration is less than half of the duration of the time-sharing period.

14. The control method according to claim 13, wherein the second duration is less than 8 ms.

15. The control method according to claim 14, wherein the second duration is equal to 3 ms.

* * * * *